United States Patent
Yamanaka et al.

(10) Patent No.: US 9,076,402 B2
(45) Date of Patent: Jul. 7, 2015

(54) LIQUID CRYSTAL DISPLAY DEVICE

(75) Inventors: Satoru Yamanaka, Minato-ku (JP);
Shinichi Hirota, Minato-ku (JP);
Kazuya Arima, Minato-ku (JP)

(73) Assignees: Kabushiki Kaisha Toshiba, Tokyo (JP);
JAPAN DISPLAY INC., Tokyo (JP)

( * ) Notice: Subject to any disclaimer, the term of this patent is extended or adjusted under 35 U.S.C. 154(b) by 836 days.

(21) Appl. No.: 12/698,209

(22) Filed: Feb. 2, 2010

(65) Prior Publication Data
US 2010/0214261 A1 Aug. 26, 2010

(30) Foreign Application Priority Data

Feb. 24, 2009 (JP) ................. P2009-040647

(51) Int. Cl.
*G06F 3/044* (2006.01)
*G09G 3/36* (2006.01)
*G02F 1/1333* (2006.01)

(52) U.S. Cl.
CPC .......... *G09G 3/3655* (2013.01); *G02F 1/13338* (2013.01); *G09G 2310/0248* (2013.01)

(58) Field of Classification Search
CPC .............................. G09G 3/3655; G06F 3/044
USPC ........................................................ 345/174
See application file for complete search history.

(56) References Cited

U.S. PATENT DOCUMENTS

| 6,448,948 | B1 * | 9/2002 | Friedman ...................... 345/74.1 |
| 6,552,705 | B1 * | 4/2003 | Hirota .............................. 345/92 |
| 6,670,944 | B1 * | 12/2003 | Ishii .............................. 345/100 |
| 6,836,269 | B2 * | 12/2004 | Maeda et al. ................. 345/212 |
| 7,030,860 | B1 | 4/2006 | Hsu et al. |
| 2001/0015783 | A1 | 8/2001 | Ohta et al. |
| 2005/0179671 | A1 * | 8/2005 | DeGroot et al. ............. 345/173 |
| 2006/0044296 | A1 * | 3/2006 | Murade ......................... 345/204 |
| 2006/0192767 | A1 * | 8/2006 | Murakami .................... 345/173 |
| 2007/0296905 | A1 | 12/2007 | Yamanaka |
| 2008/0165134 | A1 * | 7/2008 | Krah ............................ 345/173 |
| 2009/0009446 | A1 * | 1/2009 | Kamijo et al. ................. 345/87 |

* cited by examiner

*Primary Examiner* — Towfiq Elahi
(74) *Attorney, Agent, or Firm* — Oblon, McClelland, Maier & Neustadt, L.L.P.

(57) ABSTRACT

A liquid crystal display device includes a pixel array substrate having signal lines and scan lines arranged in a matrix, and pixel circuits arranged at intersections of the signal and scan lines. A touch panel is attached on the counter substrate to draw pictures or characters on a display panel. A first voltage generation circuit generates an analog pixel voltage applied to the signal lines and a second voltage generation circuit generates a counter electrode voltage applied to the counter electrode. A settling adjustment circuit adjusts a settling time of at least one of the analog pixel voltage and the counter electrode voltage.

5 Claims, 10 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2009-040647 filed Feb. 24, 2009, and the entire contents of which are incorporated herein by reference.

BACKGROUND OF THE INVENTION

1. Field of the Invention

The present invention relates to a liquid crystal display device having a touch panel and more particularly to a noise suppression circuit for the touch panel.

2. Description of the Background Art

Recent electronic equipments have used liquid crystal display devices have been used with a touch panel in order to achieve cost reduction, lightness and compactness by a reduction in a number of buttons and an increase in operability of the display panel. However, a problem arises due to touch panel malfunction caused by EMI (Electro Magnetic Interference). For example, when a picture is drawn using touch pen contact on the liquid crystal display panel, if EMI noises are generated, a correct picture tracing the movement of the touch pen may not be drawn because a signal that shows contact of the touch pen breaks up during the drawing.

The above problems are caused by following noises:
(1) a noise generated in the liquid crystal display panel due to abrupt changes of voltages of signal lines in the liquid crystal display panel.
(2) a high frequency noise due to an abrupt rise or fall of a counter electrode voltage Vcom.
(3) a noise due to an abrupt rise or fall of an analog pixel voltage of Vsig.
(4) a noise generated by an interaction of noises contained in the counter electrode voltage Vcom and a liquid crystal line voltage Vcs.

One proposal to prevent the noises generated in the LCD panel or a LCD driver circuit from reaching the touch panel is, for example, to arrange a transparent shield plate to shield the noises between the liquid crystal display panel and the touch panel. However, in such an approach, sufficient thickness is required to achieve a suitable shielding effect. On the other hand, as the shield plate becomes thicker, insufficient light transmission is obtained, which results in darkness of the panel. Moreover, if a shield plate is used, the cost of parts composing the display is increased and manufacturing processes become complicated. Accordingly, use of a shield plate is problematic.

Japanese patent application No. 1997-352837 proposes a noise elimination circuit in which noises generated in a LCD panel are discarded from input data by the touch panel. However, the technology does not eliminate the origin of the noise, therefore, it is difficult to achieve a fundamental solution to solve the problem with high reliability.

BRIEF SUMMARY OF THE INVENTION

The present invention has been made to address the above-mentioned problems. One object of this invention is to provide a noise suppression circuit, for noise generated in the liquid crystal display panel or a LCD driver, for the liquid crystal display panel with a touch panel.

Thus, according to one aspect of the invention, there is provided a liquid crystal display device, including, a pixel array substrate including signal lines and scan lines arranged in a matrix and pixel circuits arranged at intersections of the signal and scan lines; a counter substrate including a counter electrode; signal drivers connected to the signal lines to drive the signal lines; scan drivers connected to the scan lines to drive the scan lines; a switching transistor formed in each of the pixel circuits; a liquid crystal layer held between a pixel electrode connected to the switching transistor and the counter electrode; a touch panel attached on the counter substrate; a first voltage generation circuit to generate an analog pixel voltage applied to the signal lines; a second voltage generation circuit to generate a counter electrode voltage applied to the counter electrode; and a settling adjustment circuit to adjust a settling time of at least one of the analog pixel voltage and the counter electrode voltage.

According to another aspect of the invention, there is provided a method for manufacturing a liquid crystal display device including a pixel array substrate including signal lines and scan lines arranged in a matrix and pixel circuits arranged at intersections of the signal and scan lines, and a counter substrate including a counter electrode, including the steps: forming signal drivers and scan drivers connected to the signal lines and the scan lines, respectively; forming a switching transistor in each of the pixel circuits; injecting a liquid crystal material between the pixel array substrate and the counter substrate; attaching a touch panel on the counter substrate; applying a first voltage to the signal lines; applying a second voltage to the counter electrode; and adjusting a settling time of at least one of the first voltage and the second voltage.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
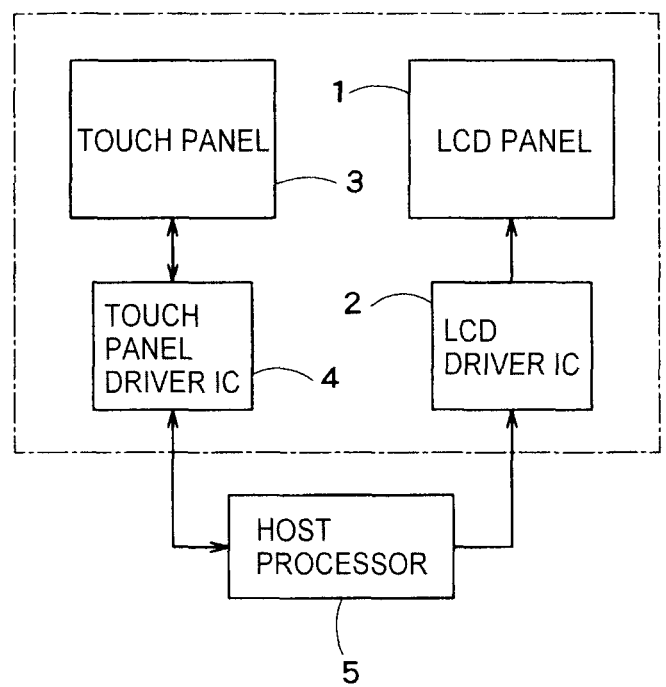
FIG. 1 is a schematic block diagram showing a liquid crystal device with a touch panel according to a first embodiment of the invention.

A liquid crystal display device according to an exemplary embodiment of the present invention, in particular, a liquid crystal display device having a touch panel will now be described with reference to the accompanying drawings wherein the same or like reference numerals designate the same or corresponding parts throughout the several views.

Hereinafter, a liquid crystal display device according to a first embodiment will be explained referring to figures.

First Embodiment

FIG. 1 is a schematic construction view showing a liquid crystal device with a touch panel according to a first embodiment of the invention. The liquid crystal display device includes a liquid crystal panel 1, a LCD driver IC 2, a touch panel TP 3 and a touch panel driver IC 4. The liquid crystal display device transmits to and receives various data from a host processor 5. The LCD driver IC 2 drives the LCD panel 1 based on commands from the host processor 5. In the LCD panel 1, pictures or characters are displayed. The touch panel driver IC 4 drives a touch panel 3. Further, the host processor 5 receives information with respect to a contact of a finger or a touch pen and a location of the contacts. According to the information, the pictures and the characters are drawn and displayed in the LCD panel 1 and the host processor 5 processes some commands.

To detect the location of the contact in the touch panel 3, a resistive film method is used. The touch panel 3 of the resistive film method is configured by laminating a film on a base glass substrate interposing small spacers between the film and the glass substrate. Respective transmissive electrodes formed of, for example, ITO (Indium Tin Oxide) film are attached on the surfaces of the film and the glass substrate. The electrodes are arranged facing each other through the spacers. When no contact is made with the film, respective electrodes formed on the surfaces of the film and the glass substrate do not contact each other and a current does not flow between the electrodes. On the other hand, when a finger or touch pen contacts with the film, the film bows and the respective electrodes are connected. Consequently, a current flows between the electrodes and the location of the contact by the finger or the touch pen is detected. The voltage values of detected voltages depend on the contacted location. Accordingly, the contacted location is detected by measuring the voltage value. It is possible to reliably detect the contacted location with low cost by the resistive method.

A touch panel 3 using a static capacitance may be adopted, in which a closing finger is detected by detecting a change of surface charges if the finger closes to the touch panel 3. According to the above touch panel 3, a lighter display can be achieved compare with the resistive film method. Other touch panels using an infra-red radiation method or an electro magnetic induction method may be used for various uses. Therefore, the touch panel method in this embodiment is not limited to the resistive film method. According to the present embodiment, the noises generated in the LCD panel 1 are suppressed to prevent a malfunction of the touch panel 3.

Figure 2:
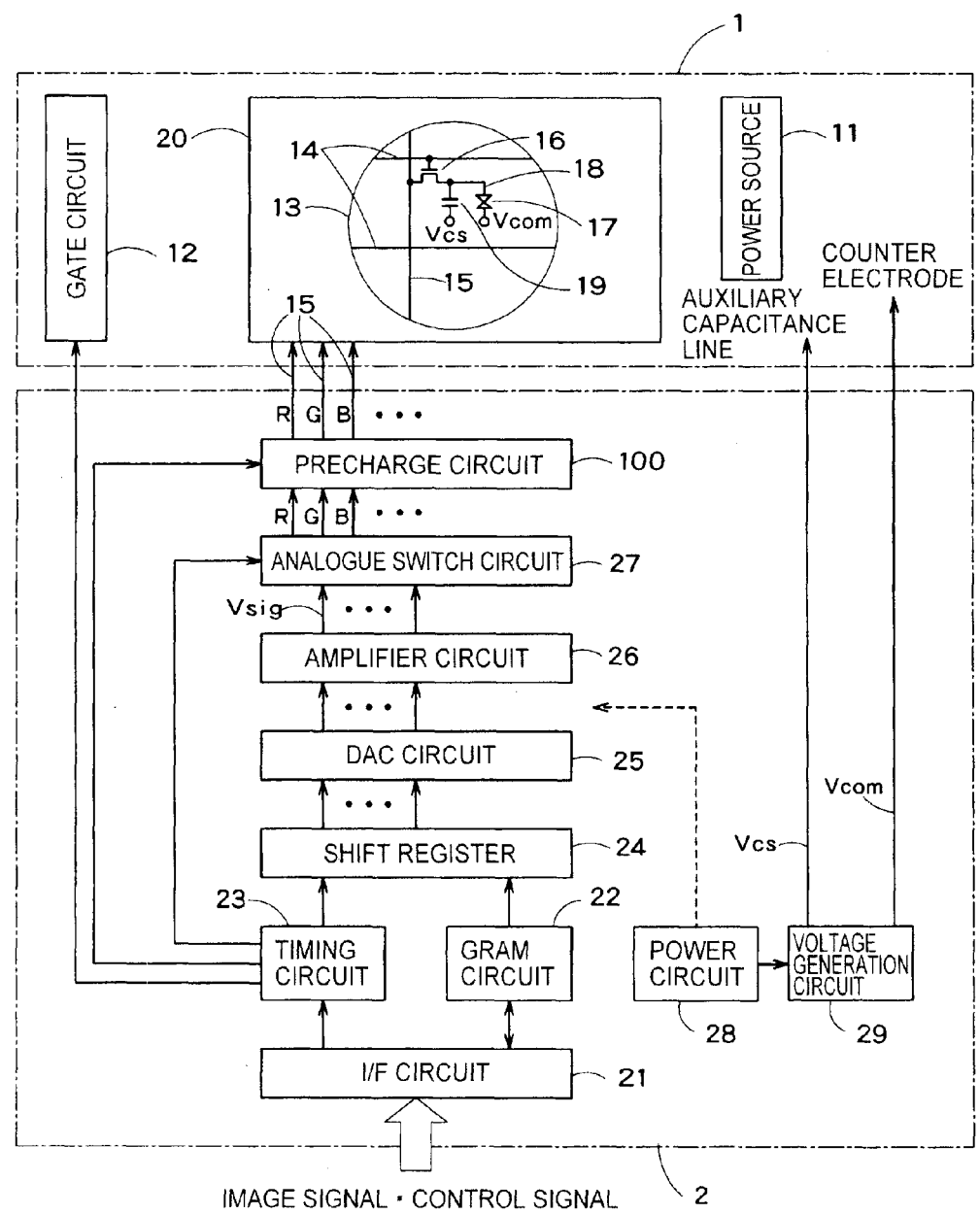
FIG. 2 is a block diagram showing an internal structure of the liquid crystal display device shown in FIG. 1 according to a first embodiment of the invention.

FIG. 2 is a block diagram showing an internal structure of the liquid crystal display device shown in FIG. 1 according to a first embodiment of the invention. The LCD panel 1 includes, a gate circuit 12 (scan line driver), a power source 11, and a pixel array 20, which are formed of a low temperature poly-silicon technology (LTPS). In the pixel array 20, scan lines 14 in a horizontal direction and signal lines 15 in a vertical direction are respectively arranged. Pixel circuits 13 are formed at intersections, cross points, i.e., where the scan lines 14 and signal lines 15 cross. A transmissive touch panel 3 is attached on the LCD panel 1 so as to cover the pixel array 20. In this embodiment, one example of the pixel array 20 is shown, in which the scan lines 14 of 480 lines and the signal lines 15 of 640 lines are arranged in a matrix and 640×480 pixel circuits 13 are formed at the cross points. In this embodiment, the LCD panel displays sixty pictures in each second (frame).

Respective pixel circuits 13 include a pixel switching TFT (Thin Film Transistor) 16 (pixel switching transistor), a liquid crystal capacitance 17, a pixel ITO electrode 18 and an auxiliary LCD capacitance 19. A gate electrode, a source electrode and a drain electrode of the pixel TFT 16 are connected to the signal lines 15, the scan line 14 and a pixel ITO 18, that is, a transparent electrode respectively. The auxiliary LCD capacitance 19 is formed between the pixel ITO 18 and an auxiliary LCD capacitance line.

The LCD panel 1 includes a pair of glass substrates, that is, a pixel array substrate and a counter substrate attached to each other with a space of several μm, and a liquid crystal layer interposed therebetween. A LCD capacitance 17 is formed between the pixel ITO 18 on the pixel array substrate and the counter electrode on the counter substrate. On the counter electrode, three color filters, R (red), G (green) and B (blue) are formed. A white back light enters from a rear side of the pixel array substrate to the counter substrate. A common voltage Vcom is applied to all the pixel circuits 13. Further, a capacitance line voltage Vcs is commonly applied to the capacitance line for all the pixel circuit 13.

Next, one example of the operation of the LCD panel will be explained. A gate circuit 12 generates scan line voltages by timing signals supplied from the timing circuit 23 and sequentially selects and drives the selected scan lines 14. The pixel TFT 16 connected to the selected scan lines becomes in "ON" state and a pixel voltage is applied to a pixel ITO 18 through the signal lines 15. According to the pixel voltage, a voltage applied between a liquid crystal layer changes and an alignment of the liquid crystal material also changes. The LCD material becomes a light shutter, and a transmission ratio is controlled corresponding to the alignment of the liquid crystal material. Consequently, the LCD panel 1 displays images. A LCD capacitance 17 stores electric charges corresponding to the pixel voltage and holds the electric charges until next signals are applied. A storage capacitance 19 controls leakage of the stored charges in the LCD capacitance 17. Since, the construction and the operation of the above mentioned LCD panel 1 are only one example, the LCD panel 1 is not limited to that shown in FIG. 2.

The LCD driver IC 2 includes an interface circuit (I/F) 21, a GRAM (graphic RAM) circuit 22, the timing circuit 23, a shift register circuit 24, a DAC (Digital to Analog Converter) circuit 25, an amplifier circuit 26, an analog switch circuit 27, a power source circuit 28, a voltage generation circuit 29 and a precharge circuit 100.

Image signals and various control signals are applied to the LCD driver IC 2 from the host processor 5. All of the signals are digital. The LCD driver IC 2 converts the image signals from the host processor 5 to analog pixel voltages and drives the signal lines 15 at a predetermined timing as a signal line driver. The voltage generation circuit 29 generates a counter electrode voltage Vcom and a capacitance line voltage Vcs and applies the voltages to the counter electrode and the auxiliary capacitance line, respectively. The voltage generation circuit 29 inverts polarities of the counter electrode voltage Vcom and the capacitance line voltage Vcs each scan line and in each frame. The power source circuit 28 supplies electric power to respective circuits of the LCD driver IC 2.

The interface circuit 21 in the LCD driver IC 2 receives and outputs various signals from the host processor 5 to respective circuits in the LCD driver IC 2. The image signals from the host processor 5 are, for example, 8-bits digital signals. The GRAM circuit 22 is used to temporarily store the image signals and may be also used to temporarily store the contact location data by the touch panel 3. The timing circuit 23 generates various timing signals to control the signal lines 15 and the scan lines 14 based on the image signals and various control signals applied to the timing circuit 23. The timing signals are supplied to the shift register circuit 24, the analog switch circuit 27, a precharge circuit 100 and a gate circuit 12 in the LCD panel 1.

The shift register circuit 24 outputs Red color pixel data, Green color pixel data and Blue color pixel data that are obtained by rearranging the image data in an order to drive the signal lines. In more detail, the shift register circuit 24 simultaneously outputs all the Red color pixel data arranged in one scan line, then the Green color pixel data and the Blue color pixel data arranged in the same scan line. Similarly, each of the color pixel data is successively output in every scan line. The number of image signals that the shift resister circuit 24 simultaneously outputs is 640, that is, the number of the pixels arranged in the horizontal direction. The DAC circuit 25 converts respective color pixel data outputted from the shift resister circuit 24 to analog signals. The amplifier circuit 26 amplifies the analog signals to a voltage level at which the analog signals can drive the LCD panel 1. Hereinafter, the amplified analog signals are called analog pixel voltage Vsig.

The analog switch circuit 27 outputs analog pixel voltages Vsig to the signal lines 15 in the LCD panel 1 at a predetermined timing. The signal lines 15 corresponding to the Red pixel, the Green pixel and the Blue pixel are arranged in the vertical direction in the LCD panel 1. Accordingly, the total number of the signal lines 15 is 640×3=1920. The analog switch circuit 27 switches the analog pixel voltage Vsig to output to the signal lines corresponding to respective color pixels based on the timing signals.

Figure 3:
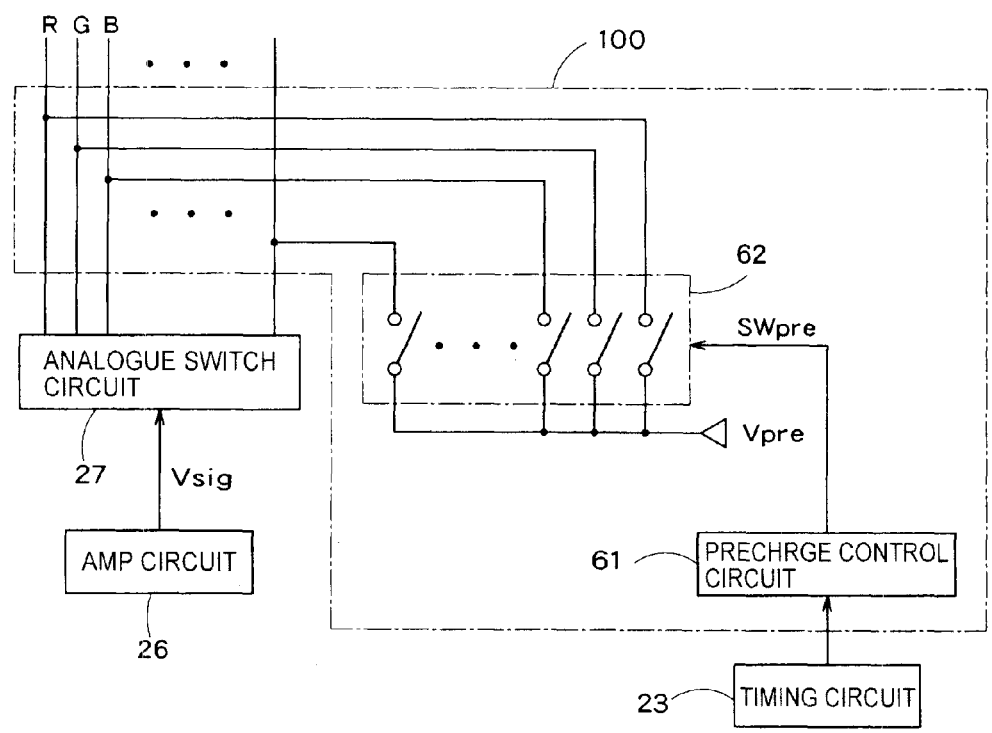
FIG. 3 is a schematic diagram showing an internal structure of a precharge circuit 100 used in the liquid crystal display device shown in FIG. 2 according to a first embodiment of the invention.

In this embodiment, a precharge circuit 100 is formed in the LCD driver IC 2. The precharge circuit 100 precharges all the signal lines at a horizontal blanking time before the gate circuit 12 starts to scan a new scan line 15. FIG. 3 is a schematic diagram showing an internal structure of a precharge circuit 100 used in this embodiment. The precharge circuit 100 includes a precharge control circuit 61 and switches 62 provided to respective signal lines.

The precharge control circuit 61 sets all the switches 62 in the "ON" state at a predetermined timing based on the timing signals generated by the timing circuit 23. In more detail, all the signal lines 15 are precharged to the same precharge voltage Vpre at the horizontal blanking time when all the switches 62 becomes in the "ON" state.

As mentioned-above, since the polarity of the counter electrode voltage Vcom is inverted in every scan line and frame, the polarity of the signal lines 15 also is inverted. If the precharge operation is not conducted, the voltage of the signal line 15 largely swings from a positive voltage (for example, +4 V) to a negative voltage (for example, −4 V) or a negative voltage to a positive voltage. The large voltage swing results in a generation of electromagnetic noises in the entire LCD panel 1 and may further result in a malfunction of the touch panel 3. Then, the precharge circuit 100 precharges all the signal lines 15 during the horizontal blanking time. By the precharge operation, an abrupt change of the signal line 15 is prevented and further, the generation of noise is suppressed. The precharge voltage Vpre may be a predetermined voltage value (for example, "0" volt between −4 V and +4 V) or a suitable voltage may be set during manufacturing processes. In this case, the precharge voltage Vpre is not changed after having once been set.

Figure 4:
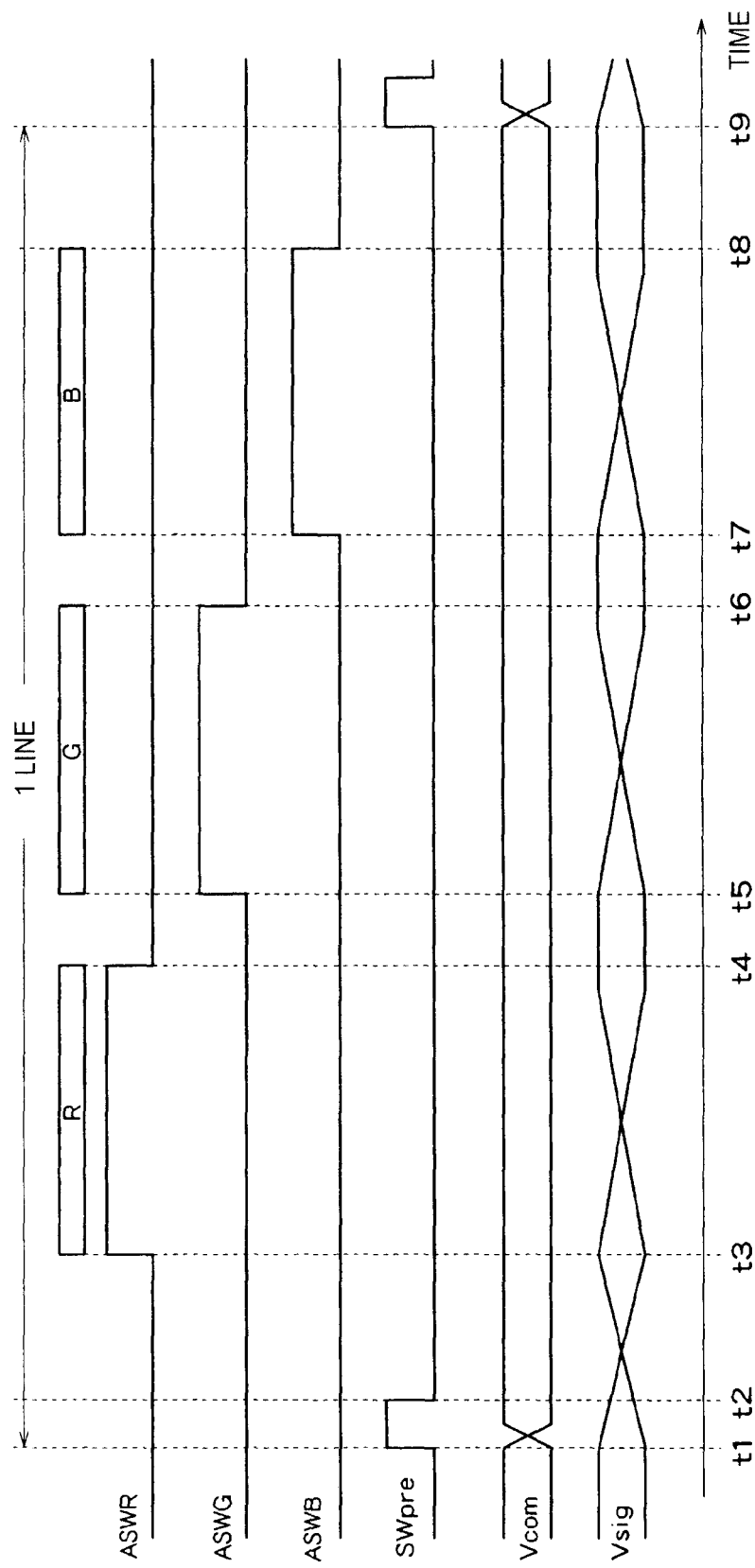
FIG. 4 is a timing chart showing an example of an operation of a driver IC 2 used in the liquid crystal display device shown in FIG. 1 according to a first embodiment of the invention.

FIG. 4 is a timing chart showing an example of an operation of a driver IC 2 used in this embodiment. A horizontal axis shows time and a vertical axis shows voltages of respective signals. Signals ASWR, ASWG, ASWB and SWpre are digital signals that control switches. When signal ASWR is high, analog pixel voltages Vsig are inputted to signal lines for red pixels arranged in the selected signal lines. The signals ASWG, ASWB similarly function to input respective signals Vsig to selected signal lines. When the signal SWpre is high, the switch 62 in the precharge circuit 100 becomes "ON" state and when the signal SWpre is low, the switch 62 in the precharge circuit 100 becomes "OFF" state.

After finishing the horizontal blanking time, firstly, the precharge control circuit 61 sets the signal SWpre at high level and the switch 62 becomes "ON" state (time t1). Accordingly, the voltage of all the signal lines 15 are precharged to the precharge voltage Vpre. Moreover, at the time t1, the polarity of the counter electrode Vcom inverts. Then, the precharge control circuit 61 sets the signal SWpre at low level and the switch 62 becomes "OFF" state (time t2). After time t2, the precharge voltage Vpre is not applied to the precharge circuit 100. The time (t1~t2) when the precharge operation is conducted is set at a horizontal blanking time, that is, earlier than time t3 when the analog pixel voltage Vsig is applied to the signal lines 15.

Next, the analog switch 27 sets the signal ASWR at a high level and the analog pixel voltage Vsig is applied to a signal line 15 for the Red pixel (time t3). At the time (t3~t4), the shift resister circuit 24 outputs LCD display signals for the red pixels. The gate circuit 12 selects the scan lines 14. Accordingly, the pixel voltages for the red pixels arranged in one scan line are applied to respective pixel circuits 13 selected by the gate circuit 13. Since the signal line 15 is precharged to the precharge voltage Vpre in advance, when the analog pixel voltage Vsig is supplied to the signal line 15, an abrupt change of the voltage of the signal line 15 does not occur, which results in suppressing generation of noises in the signal line 15.

Similarly, respective pixel voltages for green pixels and blue pixels are supplied to corresponding pixel circuits 13 at time (t5~t6) and time (t7~t8). In this time chart, the time (t8~t9) is a horizontal blanking time and a writing operation of the image data for the pixels arranged in one scan line is conducted at time (t1~t9).

After time t9, pixel voltages are supplied to the pixel circuits 13 connected to a next scan line. The precharge control circuit 61 sets the signal SWpre at high level. At the same time, the voltage generation circuit 29 inverts the polarities of the counter electrode voltages Vcom (time t9). The gate circuit 12 selects next scan line 14. Following operations are the same as those conducted at time (t1~t9).

According to this embodiment, one example in which the number of the pixels arranged in the vertical direction is 480 and the LCD panel displays 60 frame pictures in every second is shown. Accordingly, the time (t1~t9) corresponds to 1/480/60=about 35 μs. During this time, the precharge operation (time t1~t2) and the writing operation of the analog pixel voltage Vsig into respective pixels (time t3~t4, t7~t8) are conducted.

According to the first embodiment, the precharge circuit 100 is provided and all the signal lines 15 are precharged during the horizontal blanking time. Therefore, even if the polarity inversion operation is conducted, the voltage of the signal line 15 does not abruptly change and the electric magnetic noises generated in the LCD panel 1 are suppressed. Consequently, the malfunction of the touch panel 3 is prevented.

Second Embodiment

Figure 5:
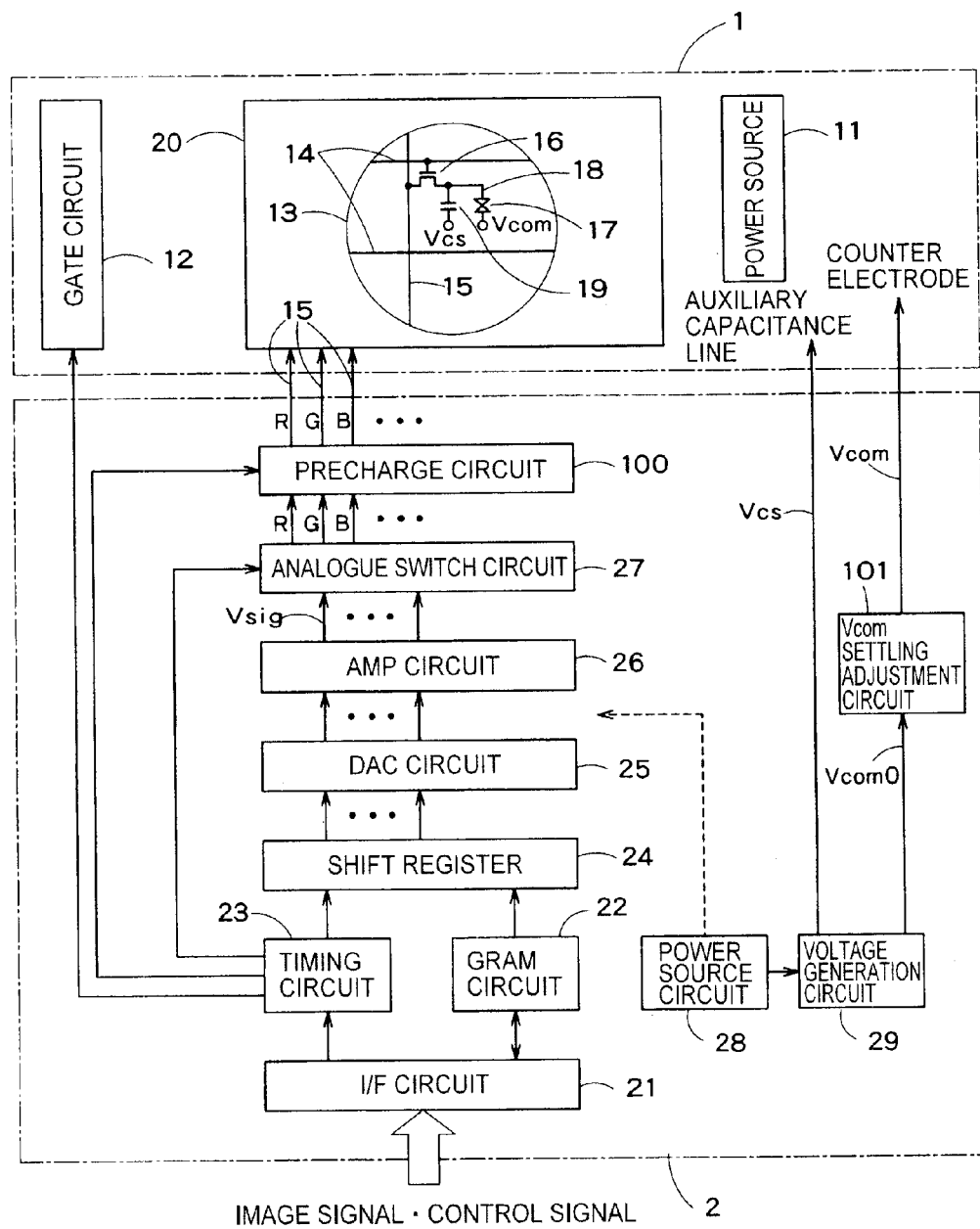
FIG. 5 is a block diagram showing an internal structure of the liquid crystal display device shown in FIG. 1 according to a second embodiment of the invention.

FIG. 5 is a block diagram showing an internal structure of the liquid crystal display device shown in FIG. 1 according to a second embodiment of the invention. In this embodiment, a settling time of the counter electrode voltage Vcom is adjusted. That is, a Vcom settling adjustment circuit 101 is provided in the LCD driver circuit LC 2. The Vcom settling adjustment circuit 101 generates a counter electrode voltage Vcom based on a voltage Vcom0 generated by the voltage generation circuit 29 and applies the generated voltage Vcom to the counter electrode in the LCD panel 1. The Vcom settling adjustment circuit 101 adjusts a settling time of the counter electrode voltage Vcom. Here, the counter electrode voltage Vcom settling time means a time while one polarity voltage value of the counter electrode voltage Vcom converges to another polarity voltage by starting the change from the one polarity voltage of the counter electrode voltage Vcom.

Figure 6:
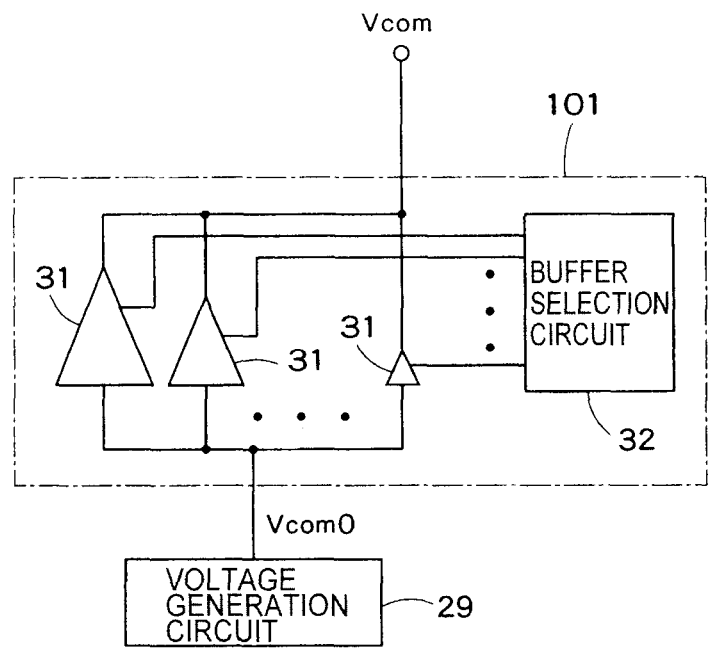
FIG. 6 is a schematic diagram showing an internal structure of a Vcom settling adjustment circuit 101 used in the liquid crystal display device shown in FIG. 5 according to the second embodiment of the invention.

FIG. 6 is a schematic diagram showing an internal structure of a Vcom settling adjustment circuit 101 used in the LCD driver IC 2 shown in FIG. 5 according to the second embodiment of the invention. The Vcom settling adjustment circuit 101 includes a plurality of buffer circuits 31, in which a signal delay time is different from each other, and a buffer selection circuit 32. The buffer selection circuit 32 controls the buffer circuits 31 to output the Vcom from only one of the buffer circuits 31 and controls the settling time of the counter electrode voltage Vcom.

Figure 7:
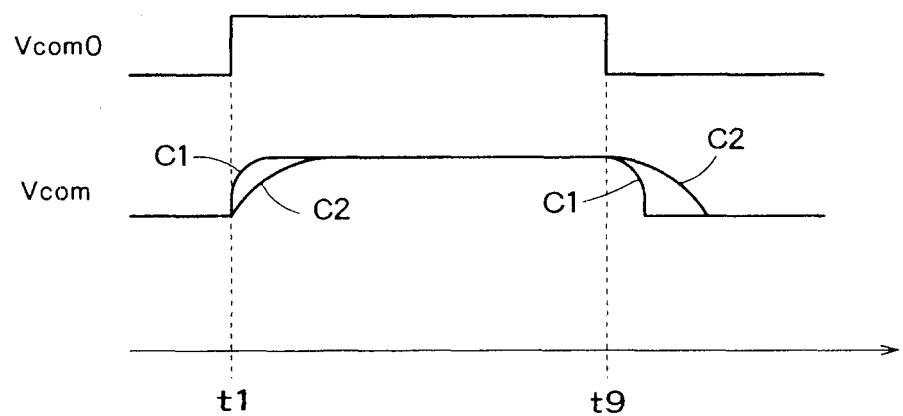
FIG. 7 is a timing chart showing an example of an operation of the Vcom settling circuit 101 used in the liquid crystal display device shown in FIG. 5 according to the second embodiment of the invention.

FIG. 7 is a timing chart showing an example of an operation of the Vcom settling adjustment circuit 101 used in the second embodiment shown in FIG. 5. In this timing chart, the horizontal axis indicates time and the vertical axis indicates voltage. As shown in FIG. 4, the counter electrode voltage Vcom inverts at times t1 and t9. Hereafter, the polarity of the counter electrode voltage Vcom inverts from a negative polarity to a positive polarity and inverts from the positive polarity to the negative polarity at time t9. At time t1, the voltage generation circuit 29 abruptly raises the polarity of the voltage Vcom0 from a negative voltage to a positive voltage. In the Vcom settling adjustment circuit 101, the voltage Vcom is converted to a positive voltage within a predetermined time corresponding to a driving ability of the buffer circuits 31. When the buffer selection circuit 32 selects a buffer circuit in which the driving ability is high, the counter electrode voltage Vcom converges to a positive voltage as shown in a curve C1 in a short time from the time t1, that is, the settling time is short. When the buffer selection circuit 32 selects a buffer circuit in which the driving ability is low, the counter electrode voltage Vcom converges to a positive voltage as shown in a curve C2 in a longer time from the time t1, that is, the settling time is long. According to above settling method, the settling time of the counter electrode voltage Vcom can be adjusted. In this embodiment, it takes, for example, several μs to settle.

When the counter electrode voltage Vcom abruptly changes, high frequency noises are generated which results in the malfunction of the touch panel 3. Then, the Vcom settling adjustment circuit 101 adjusts the settling time of the counter electrode voltage Vcom so as to gradually change. In more detail, a rising time and a falling time of the counter electrode voltage Vcom are dulled. Accordingly, the counter electrode voltage Vcom are converted with reduced high frequency components, which results in suppressing generation of high frequency noises.

The longer the settling time of the counter electrode voltage Vcom is, the smaller the noise generated in the LCD panel 1 becomes. However, if the settling time is too long, it becomes difficult to get enough time to input the analog pixel voltages Vsig to the signal lines 15 (time t3~t8 in FIG. 4). If the analog pixel voltages Vsig are inputted to the signal lines 15 before the polarity of the counter electrode voltage Vcom is stably fixed, following driving operations with a polarity judgment are inaccurately made and desired images are not displayed. Therefore, the buffer control circuit 32 selects a buffer circuit 31 that sets the settling time as long as the image signals inputted to the LCD driver IC 2 corresponding to the images and various control signals from the host processor 5 are correctly displayed. If this selection of the buffer circuit 31 is made during manufacturing, and once made, the selection need not be later changed. Other operations are the same as those in the first embodiment.

As mentioned-above, in this second embodiment, even if the polarity inversion driving is made, the settling time of the counter electrode voltage Vcom is adjusted so that the counter electrode voltage Vcom does not abruptly change by providing the Vcom settling adjustment circuit 101. Therefore, the counter electrode voltage Vcom does not generate high frequency noise and malfunction of the touch panel 3 is prevented.

Third Embodiment

Figure 8:
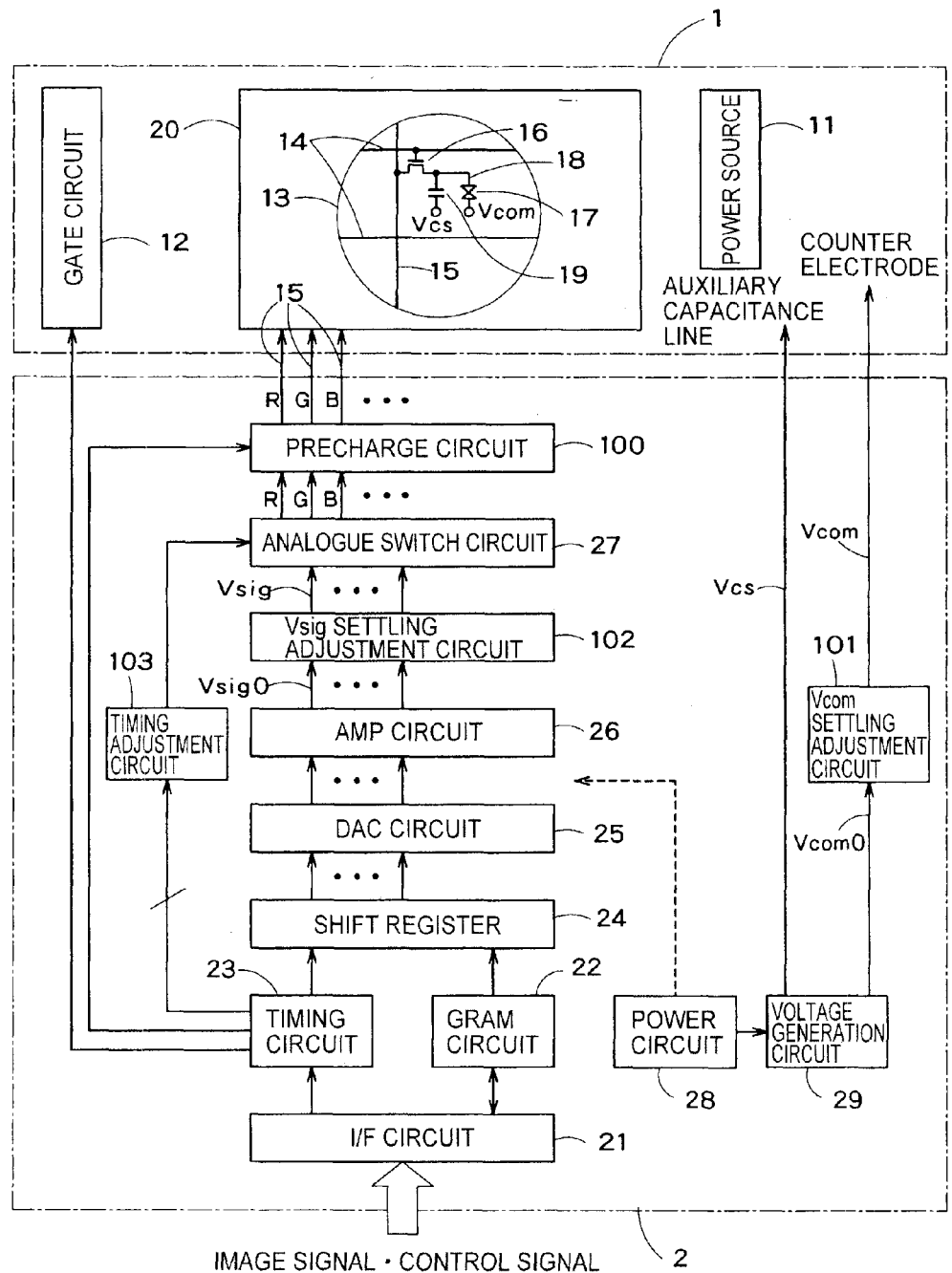
FIG. 8 is a schematic internal construction view showing a liquid crystal device with a touch panel according to a third embodiment of the invention.

The third embodiment of the invention adjusts a settling time of the analog voltage Vsig. FIG. 8 is a schematic internal construction view showing a liquid crystal device with a touch panel.

The LCD driver IC 2 further includes a Vsig settling adjustment circuit 102 and a timing adjustment circuit 103 in addition to the construction of the LCD driver circuit 1 shown in FIG. 5.

The Vsig settling adjustment circuit 102 is connected between the amplifier circuit 26 (first voltage generation circuit) and the analog switch circuit 27. The Vsig settling adjustment circuit 102 adjusts a settling time of the analog pixel voltage Vsig and outputs to the analog switch circuit 27. Here, the settling time of the analog pixel voltage Vsig means the time while the analog pixel voltage Vsig starts to change the voltage value and finally converges to a predetermined voltage level.

The timing adjustment circuit 103 is connected between the timing circuit 23 and the analog switch circuit 27. The timing adjustment circuit 103 adjusts the timing signals of digital signals ASWR, ASWG and ASWB.

Figure 9:
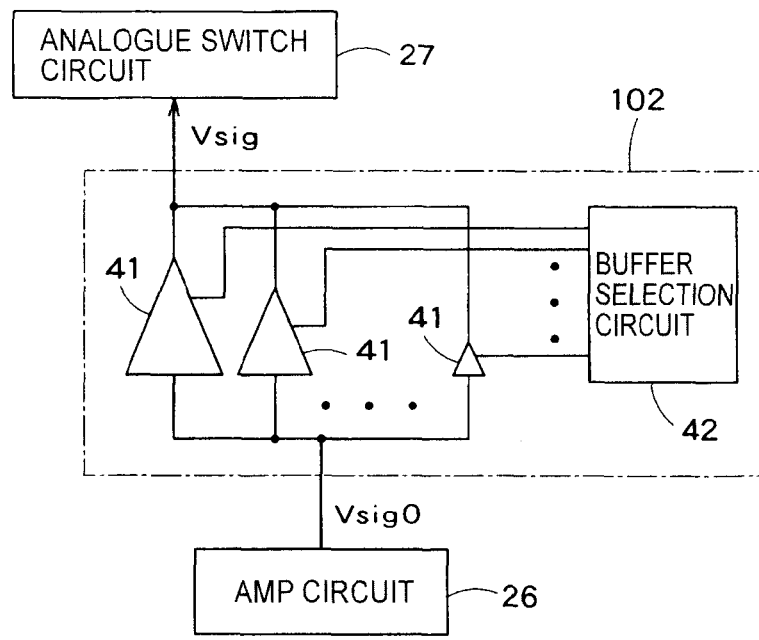
FIG. 9 is a view showing an internal structure of a Vsig settling circuit 102 used in the liquid crystal display device shown in FIG. 8 according to the third embodiment of the invention.

FIG. 9 is a view showing an internal structure of a Vsig settling adjustment circuit 102 used in the LCD driving circuit 1 shown in FIG. 8 according to the third embodiment of the invention. The Vsig settling adjustment circuit 102 includes a plurality of buffer circuits 41 and a buffer selection circuit 42. The Vsig settling adjustment circuit 102 is provided to each of the analog pixel voltage Vsig lines.

Construction and operation of the Vsig settling adjustment circuit 102 are almost the same as that of the Vcom settling adjustment circuit 101 shown in FIG. 6. That is, the Vsig settling adjustment circuit 102 adjusts the settling time so that the analog pixel voltage Vsig does not abruptly change and the settling time is set at several µs. Accordingly, it becomes possible to suppress noise caused by abrupt rising or falling of the analog pixel voltage Vsig.

If the settling time of the analog pixel voltage Vsig is long, a timing when the analog pixel voltages Vsig are inputted to the analog switch circuit 27 is off the timing when the analog switch 27 switches over. If the timing is off, for example in FIG. 4, although the signal ASWR becomes high at time t3, the analog pixel voltage Vsig may not yet be applied to the analog switch circuit 27 at time t3. In this case, correct images are not displayed in the LCD panel 1. Then, the timing adjustment circuit 103 controls the timing to switch the analog switch circuit 27 by delaying the timing signals to switch the analog switch circuit 27, that is, matched to the settling time of the analog pixel voltages Vsig.

Figure 10:
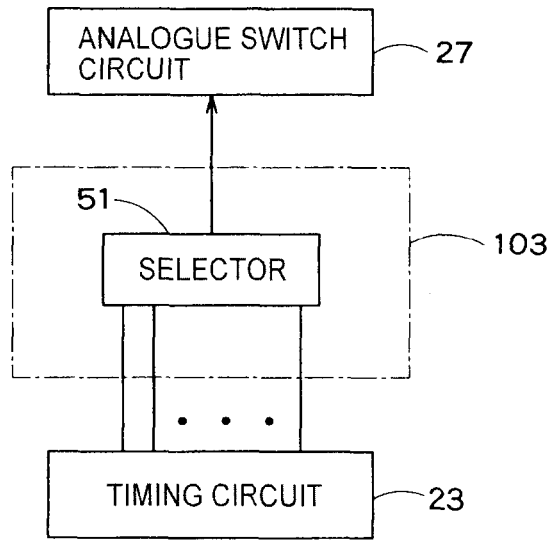
FIG. 10 is a view showing an internal structure of a timing adjustment circuit 103 used in the liquid crystal display device shown in FIG. 8 according to the third embodiment of the invention.

FIG. 10 is a view showing an internal structure of the timing adjustment circuit 103 used in the LCD panel 1 shown in FIG. 8. The timing adjustment circuit 103 includes a selector 51. The timing circuit 23 generates a plurality of candidate timing signals in which the delay times are different from each other and outputs them to the timing adjustment circuit 103. The selector 51 in the timing adjustment circuit 103 selects and outputs one of the candidate signals to the analog switch circuit 27 as a timing signal.

In more detail, the longer the settling time of the analog pixel voltages Vsig is, the selector 51 selects a timing candidate signal with a longer delay time. After the above adjustment, a suitable timing signal is applied to the analog switch circuit 27 in synchronism with timing of when an analog pixel voltage Vsig is inputted to the analog switch circuit 27. Consequently, the signal ASWR becomes high in synchronism with the analog pixel voltage Vsig, and the analog pixel voltage Vsig is reliably applied to the signal lines 15.

The settling time of the analog voltage Vsig and the delay time of the timing signal are set as long as the images are correctly displayed as shown in the second embodiment. The setting may be made during manufacturing and need not to be changed thereafter. Other operations are the same as those of the second embodiment.

As mentioned-above, in this third embodiment, the Vsig settling adjustment circuit 102 is provided in the LCD driving circuit 1 and the analog pixel voltage Vsig is controlled so that the analog pixel voltages Vsig do not abruptly change. Accordingly, noise caused by the abrupt rising and falling of the analog pixel voltage Vsig is not generated. Therefore, the malfunction of the touch panel 3 caused by the noise generated in the LCD panel 1 is prevented.

Further, the timing adjustment circuit 103 is provided and the switching time of the analog switch circuit 27 is controlled so as to match the settling time of the analog pixel voltage Vsig. Accordingly, even if the settling time of the analog pixel voltages Vsig is voluntarily changed, the images are reliably displayed in the LCD panel 1. When the settling time of the analog pixel voltages Vsig is set short, the timing adjustment circuit 103 is eliminated. In this case, it becomes possible to make the size of the LCD driver IC 2 small.

Fourth Embodiment

Although, the voltage generation circuit 29 generates both a counter electrode voltage Vcom and an auxiary capacitance line voltages Vcs in the first to the third embodiments, the counter electrode voltage Vcom and the auxiary capacitance line voltages Vcs are generated by independent circuits in this fourth embodiment as described hereinafter.

Figure 11:
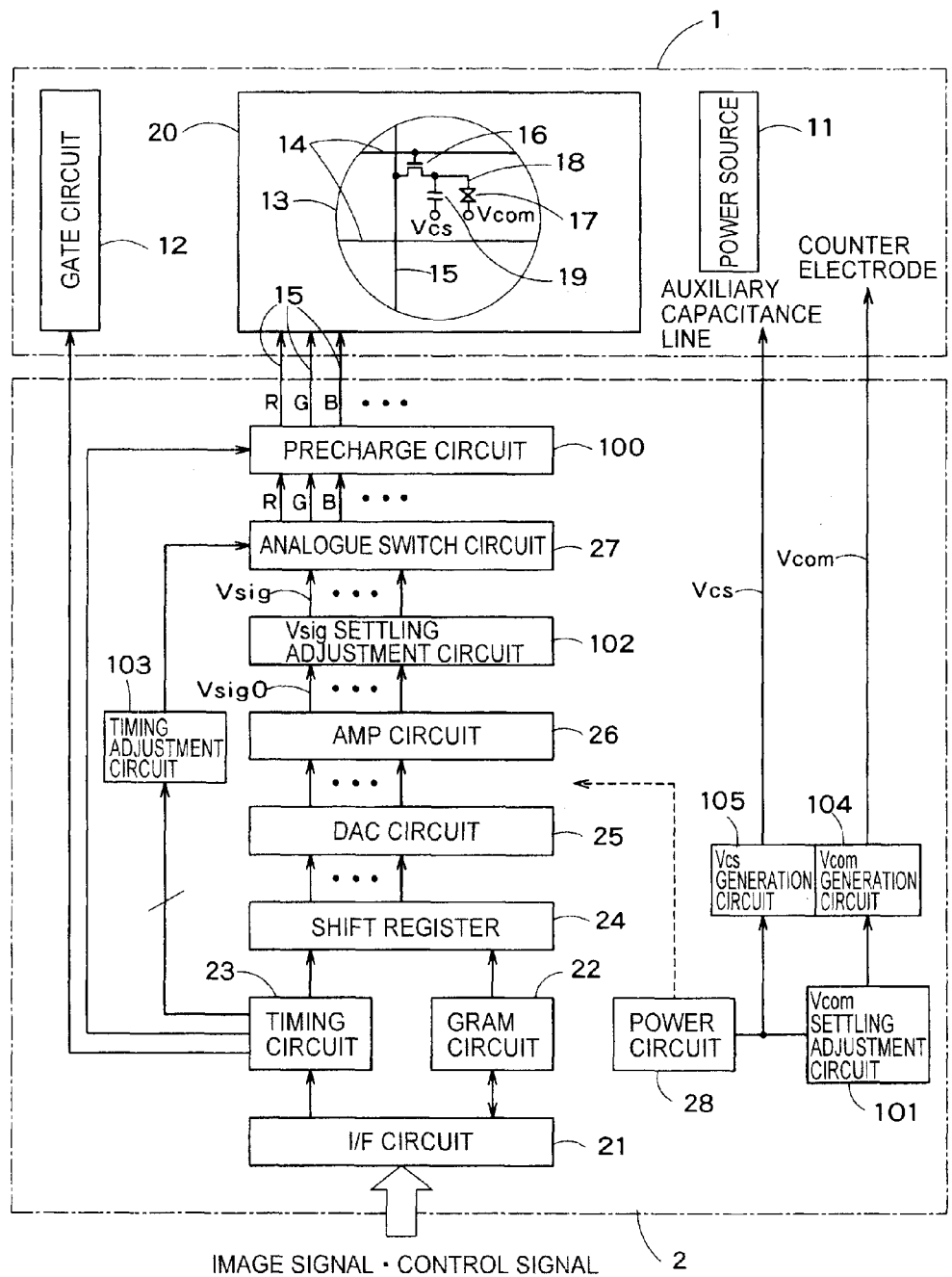
FIG. 11 is a schematic internal construction view showing a liquid crystal device with a touch panel according to a fourth embodiment of the invention.

FIG. 11 is a schematic internal construction view showing a liquid crystal device with a touch panel according to a fourth embodiment of the invention. The LCD driver IC 2 includes a Vcom generation circuit 104 and a Vcs generation circuit 105 in place of the voltage generation circuit 29. If the counter electrode voltages Vcom and the auxiary capacitance line voltages Vcs are generated in one voltage generation circuit 29, noises generated in one of the counter electrode voltages Vcom and the auxiary capacitance line voltages Vcs may affect each other. Accordingly, the voltage generation circuit 29 is separated and the Vcom generation circuit 104 exclusively generates a counter electrode voltage Vcom and the Vcs generation circuit 105 also exclusively generates an auxiliary capacitance line voltage Vcs.

Figure 12:
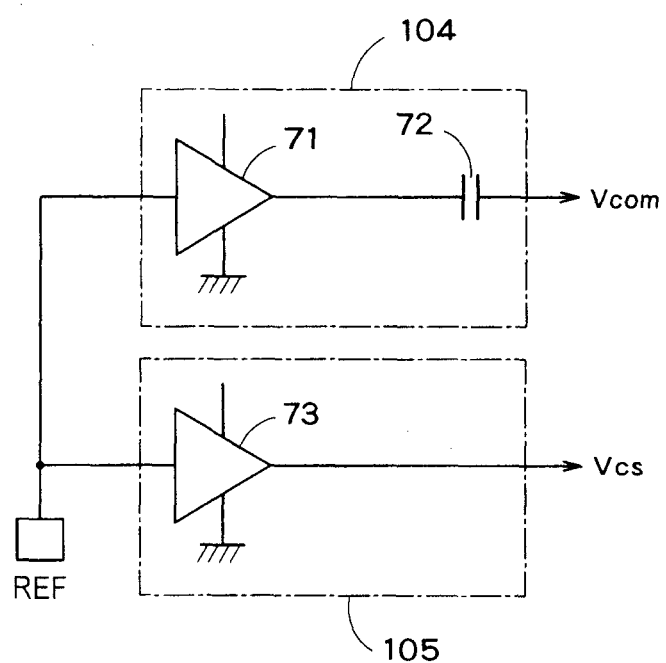
FIG. 12 is a circuit diagram showing an example of an internal structure of Vcom generation circuit 104 and Vcs generation circuit 105 used in the liquid crystal display device shown in FIG. 11 according to the fourth embodiment of the invention.

FIG. 12 is a circuit diagram showing an example of an internal structure of a Vcom generation circuit 104 and a Vcs generation circuit 105 used in the liquid crystal display device according to the fourth embodiment of the invention. The Vcom generation circuit 104 includes a buffer circuit 71 (second buffer circuit) and a connection capacitance 72 connected serially. The Vcs generation circuit 105 includes a buffer circuit 73 (first buffer circuit). A reference voltage REF generated in the power circuit 28 is applied to the buffer circuits 71 and 73 to generate the counter electrode voltages Vcom and the auxiary capacitance line voltages Vcs. The buffer circuits 71 and the connection capacitance 72 generate the counter electrode voltage Vcom, and the buffer circuit 73 generates the auxiary capacitance line voltages Vcs. In this embodiment, the connection capacitance 72 is provided against flicker phenomenon. Other operations are the same as those in the third embodiment.

According to this fourth embodiment, the circuits for generating the counter electrode voltages Vcom and the auxiary capacitance line voltages Vcs are separated. Therefore, it is possible to avoid noise generated in one of the counter electrode voltage Vcom and the auxiary capacitance line voltage from affecting the other. Consequently, the electromagnetic noises generated in the LCD panel 1 can be eliminated and the malfunction of the touch panel 3 is prevented.

In the above-mentioned embodiments, it is possible according to the invention to provide selected circuits among the circuits implemented in the LCD driver IC 2 such as the Vcom settling adjustment circuit 101, the Vsig settling circuit 102, the Vcom generation circuit and the Vcs generation circuit 105. Further, each circuit in the LCD driver IC 2 may be formed of a plurality of ICs or formed on the LCD panel using poly-silicon technology.

According to the present invention, the noises generated in the LCD panel and the driving IC are reliably suppressed and the malfunction of the touch panel is prevented.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A liquid crystal display device, comprising:
a pixel array portion including signal lines and scan lines arranged in a matrix and pixel circuits arranged in cross areas of the signal and scan lines;
signal drivers connected to the signal lines to drive the signal lines;
scan drivers connected to the scan lines to drive the scan lines; and
a touch panel attached on the pixel array portion;
wherein the pixel circuit includes
switching element formed in each of the pixel circuits;
a liquid crystal capacitance formed between a pixel electrode connected to the switching element and a counter electrode; and
an auxiliary capacitance formed between the pixel electrode and an auxiliary capacitance line;
wherein the signal drivers include
a first voltage generation circuit to generate an analog pixel voltage applied to the signal lines;
a second voltage generation circuit to generate a polarity inverted counter electrode voltage applied to the counter electrode;
a precharge circuit to apply a precharge voltage to all the signal lines generated in circumference of the pixel array portion during a horizontal blanking time prior to start a next driving of the signal lines at a time of performing a polarity inversion driving to avoid malfunction of the touch panel caused by electric magnetic noises; and
a settling adjustment circuit to adjust a settling time of the voltage generated by the second voltage generation circuit to eliminate malfunction of the touch panel caused by electric magnetic noises generated in circumference of the pixel array portion,
wherein the signal drivers generate a rise wave form and a fall wave form of the counter electrode voltage in a curved shape having gradually increasing or decreasing slope as a function of time,
such that the decreasing slope of the rise wave form has a rate of decrease that is higher than a corresponding rate of increase of the increasing slope of the fall wave form, or
such that the decreasing slope of the rise wave form has a rate of decrease that is lower than a corresponding rate of increase of the increasing slope of the fall wave form.

2. The liquid crystal display device according to claim 1, wherein the settling adjustment circuit comprises:
a plurality of buffer circuits with different input signal delay time each other, and a buffer selection circuit to select one of the buffer circuits and adjust the settling time of the voltage generated by the second voltage generation circuit.

3. The liquid crystal display device according to claim 1, wherein the signal driver circuit comprises:
an analog switch circuit to apply the analog pixel voltage to selected signal lines; and
a timing adjustment circuit to control the switching time of the analog switch so as to match to the settling time adjusted by the settling adjustment circuit.

4. The liquid crystal display device according to claim 1, wherein the liquid crystal display device comprises:
a reference voltage generation circuit to generate a reference voltage used to generate an auxiliary capacitance line voltage applied to the auxiliary capacitance line and a counter electrode voltage applied to a counter electrode;
a first buffer circuit to generate an auxiliary capacitance voltage applied to the auxiliary capacitance line based on the reference voltage; and
a second buffer circuit to generate the counter electrode voltage based on the reference voltage.

5. The liquid crystal display device according to claim 1, wherein a voltage setting of the precharge voltage and the adjustment of the settling time by the settling adjustment circuit are made in a manufacturing step of the display device and are not made after that.

* * * * *